United States Patent Office 3,470,067
Patented Sept. 30, 1969

3,470,067
CONCENTRATION AND PURIFICATION OF VIRUSES FROM PARTICULATE MAGNETIC IRON OXIDE-VIRUS COMPLEXES
Joel Warren and Alan L. Neal, Terre Haute, Ind., and David A. Rennels, Pasadena, Calif., assignors to Chas. Pfizer & Co., Inc., New York, N.Y., a corporation of Delaware
No Drawing. Continuation-in-part of application Ser. No. 489,076, Sept. 21, 1965. This application Sept. 19, 1967, Ser. No. 668,946
Int. Cl. C12k 7/00; A61k 23/00
U.S. Cl. 195—1.5                                    4 Claims

ABSTRACT OF THE DISCLOSURE

The ability of iron oxide to complex with microorganisms leads to useful iron oxide-virus compositions and to an invaluable means of purifying contaminated water.

CROSS-REFERENCE TO RELATED APPLICATIONS

This is a continuation-in-part application of Ser. No. 489,076, filed Sept. 21, 1965, now abandoned.

BACKGROUND OF THE INVENTION

This invention relates generally to an improvement in the preparation of useful biological vaccines and as an incidental ramification thereto, the purification of contaminated water.

The search for biological vaccines in concentrated form having a high degree of purity is a never ending one. Moreover, a uniform degree of purity will insure a consistent potency which is mandatory in all vaccine preparations. As for the purification of water, one of the most challenging problems facing the entire world today is a means of making water reusable.

SUMMARY OF THE INVENTION

The primary aspect of the process of this invention involves the preparation of useful iron oxide-virus vaccine complexes. The process comprises contacting a virus suspended in an aqueous medium with a particulate magnetic iron oxide, separating the resulting iron oxide-virus vaccine complex from said medium, dissociating the iron oxide-virus vaccine complex and recovering the virus thereby released.

The novel process disclosed herein offers three distinct advantages when compared to prior art methods for producing biological vaccines. They are:

(1) an inherent purification step,
(2) a simple method for concentration, and
(3) a potency enhancement of the resulting antigens.

It is meant to include by the term virus those viruses which are live as well as inactivated, i.e. dead or attenuated. The invention is applicable broadly to viruses of the antigenic type which are capable of causing infectious diseases in man and animals. Some of the many viruses of this type which can be subjected to the present process are the rabies, mumps, influenza, parainfluenza, vaccinia, equine encephalomyelitis, canine distemper, poliomyelitis, encephalomyocarditis, hog cholera, St. Louis encephalitis, yellow fever, adenovirus, measles, Coxsackie, ECHO, and common cold viruses.

The term aqueous medium contemplates any suitable culture system well known to those trained in the art. For example, the following are illustrative of suitable culture systems: avian, simian, and human cell tissue or tissue cultures; and nutrient broth cultures.

A second or incidental aspect of the process of this invention relates to a process for the removal of pathogenic organisms from contaminated water which comprises passing said contaminated water through particulate iron oxide containing a dispersing material in sufficient amount to allow a suitable percolation rate and recovering the purified water.

Unlike the process concerned with the preparation of biological virus vaccines, this aspect deals with all pathogens, that is, any microorganism, bacterium or protozoan that produces disease. Evidently, this aspect is concerned with their removal without regard to kind whereas the vaccine preparation process is concerned with making certain useful virus vaccines. It should be understood that similar compositions for bacteria and protozoans can be prepared, but their usefulness is questionable. It is found that the present method of purifying water is far superior to any currently in use. The existing processes include microscreening, filtration, chemical coagulation, powdered carbon adsorption and electrodialysis.

DETAILED DESCRIPTION OF THE INVENTION

The process for preparing the valuable magnetic iron oxide-virus vaccine intermediate of this invention may be accomplished in two ways:

(a) cultivating a virus in an aqueous nutrient medium or tissue culture in the presence of particulate magnetic iron oxide or
(b) first growing said virus in an aqueous medium, inactivating it if desired, and then adding magnetic iron oxide as a powder or suspension.

If the procedure of method (a) is followed, there appears to be no adverse affect on tissue cultures and said iron oxide seems to be harmless to the cells which continue to multiply in a normal fashion. For instance, concentrations of iron oxide between about 0.1 mg. and about 0.5 mg./ml. in chick embryo fibroblast cultures appear to have little or no toxicity for the cells and active growth continues in the presence of the iron oxide for at least one week. Nine-day old embryonated hens' eggs inoculated with 10 mgs. of $Fe_2O_3$ into the chlorioallantoic space develop normally for at least three days.

It is not clear whether the iron oxide-vaccine complex which forms is a simple physical mixture or whether true chemical bonding occurs. However, since actual adsorption is favored by elevated temperatures, there is some indication that a true chemical bond may be formed. In the case of influenza virus, it is found that adsorption rises rapidly to a maximum efficiency of about 10 mg./ml. of iron at room temperature with shaking for 30 minutes. It is further found that said adsorption is relatively little influenced by changes in pH in the range of pH 6–9.

With regard to said particulate magnetic iron oxide, it may be in cubic or acicular form. It is found that the smaller the particle size, the more effective is the adsorption of virus from the suspension. Any treatment which renders the particles more porous and increases the surface area, as prior treatment with dilute HCl, provides an enhancement in adsorption efficiency. Best results, however, result from a magnetic iron oxide which has been ground to a fine powder by a ball milling process. An aqueous suspension of this may be sterilized in an autoclave by a steam pressure of 15–20 lbs./sq. in. for 20 minutes.

For purposes of this invention, when reference is made to the term iron oxide, the compound gamma $Fe_2O_3$ is contemplated. Although magnetic iron oxide having the formula $Fe_2O_3$ is most preferred, it is possible and within the scope of this invention to utilize any form of iron oxide which is magnetic in nature, for instance, $Fe_3O_4$, FeO or any possible combinations thereof, may be efficiently substituted for the preferred gamma $Fe_2O_3$.

The iron oxide-virus vaccine complexes of this invention can be efficiently removed from solution by means of application of a magnetic field or low-speed centrifugation. Continuous flow removal and entrapment of the iron oxide complexes can be accomplished by pulling down the materials with a magnet.

The resulting iron oxide-virus vaccine complex is quite stable and is not affected by borate or citrate buffers or organic buffers in general. For instance, the virus cannot be removed from the iron complexes by sodium citrate, formate, borate or glutamate. In addition, the bond resists a variety of surface-active agents and solvents.

It has been found, however, that effective dissociation of the iron oxide-vaccine complexes and recovery of the adsorbed viruses can be accomplished by treatment with a saturated aqueous solution of a sodium or magnesium salt of an acid selected from the group consisting of phosphoric, sulfuric and carbonic. Particularly effective dissociating media are saturated solutions of sodium phosphate or sodium bicarbonate which result in the release of said viruses which can be subsequently isolated after removal of the iron oxide by a magnet or centrifuge.

The novel means of purifying water disclosed herein makes use of the same basic principle which is inherent in the preparation of the aforesaid biological vaccines. The phenomenon that microorganisms complex with iron oxide lends itself to water purification as an inventive extension thereof. Of course, the removal of said pathogens is substantially complete and non-selectivity is an essential characteristic of the process. The fact that the water is purified is important and what it removes is secondary. There may be times, however, when a sample of contaminated water must be tested for its level of contamination. In such an instance the number of microorganisms which are removed from an aliquot of test water must be collected and measured against a standard or subjected to a suitable diagnostic determination.

The present disclosure describes a method of permitting a continuous flow filtration of relatively large volumes of fluid and the removal of the entrapped microorganisms from the filter bed. The use of glass or metal cylindrical tubes or columns for filtration purposes through such materials as sand, charcoal, diatomaceous earth etc. is well known and works equally as well for the iron oxide system disclosed herein. Since tightly packed iron powder is relatively impervious to the passage of water, it is necessary to increase the percolation rate and this is accomplished by mixing said iron oxide with a dispersing material which permits the iron oxide to adsorb and retain microorganisms and other materials from suspension while allowing free passage of the fluid at the same time. It has been found that suitable dispersing materials are sand and diatomaceous earth. Although the amount of dispersing material added is not critical, it is generally necessary to add more than 50% by weight of material of the total mixture.

As mentioned earlier, there are instances where the amount and kind of contamination in a water sample must be determined. This is carried out by:

(a) applying an aliquot of contaminated water onto a column containing a mixture of powdered iron oxide and a dispersing material;
(b) dissociating the iron oxide-pathogen complex which forms;
(c) collecting the adsorbed pathogens in a small volume of eluate; and
(d) measuring the level of contamination.

The iron oxide-pathogen complex can be dissociated chemically with an aqueous solution of the sodium or magnesium salt of phosphoric, sulfuric or carbonic acid followed by collection of the pathogens in the eluate or electrically by applying a low intensity current across the column and collecting the released pathogens by eluting the column with physiological saline and collecting the eluate.

The kind and amount of contamination can be determined by suitable procedures which are well known in the art. For example, concentration of influenza antigen can be measured by means of a hemagglutination test.

Regarding the electrical dissociation, it is found that application of 1 to 10 milliamperes at 40 volts with direct current is most preferred.

The following examples are given by way of illustration and should not be interpreted as limiting the invention, the scope of which is defined by the appended claims.

EXAMPLE I

The following table illustrates the efficiency of magnetic iron oxide in removing six different influenza viruses from suspension in infected allantoic fluid:

| Strain | Virus Concentration in Original | Virus Concentration Remaining in Supernate after Adsorption |
|---|---|---|
| PR-8 | [1] 960 | 40 |
| B/Lee | 512 | 256 |
| B/England | 128 | 8 |
| Swine | 256 | 4 |
| Jap 305 | 256 | 4 |
| Ann Arbor | 128 | 1 |

[1] Hemagglutinating units/ml.

All strains are in untreated, freshly harvested egg allantoic fluids. After mixing each virus and $Fe_2O_3$, at a concentration of 20 mg./ml., adsorption is carried out at room temperature on an orbital shaker for 30 minutes. At the end of this time the iron oxide-virus complex is pulled to the base of the glass container by a strong magnet and the supernatant clear fluid removed and tested for its ability to hemagglutinate chick erythrocytes, this being a sensitive indicator of the presence of residual virus. It is observed from the above table that considerable virus activity is removed from the supernatant fluid after removal of the iron oxide-virus complex from the solution.

EXAMPLE II

In a manner similar to the procedure outlined in Example I, a poliomyelitis virus, Sabin Type II, is complexed to iron oxide with comparable results.

EXAMPLE III

The table below describes the interdependence of iron oxide concentration and adsorption of influenza virus, strain PR-8. In this example the adsorbed virus is subsequently eluted from the $Fe_2O_3$ with 10% dibasic sodium phosphate.

DETERMINATION OF OPTIMAL AMOUNT OF $Fe_2O_3$ FOR VIRUS ADSORPTION

| | Virus Conc. in Adsorption Supernate | Virus Conc. in Eluate |
|---|---|---|
| Iron Oxide, mg./ml.: | | |
| 0 | *960 | |
| 1.0 | 640 | 480 |
| 2.5 | 480 | 640 |
| 5.0 | 160 | 640 |
| 7.5 | 120 | 960 |
| 10 | 40 | 960 |
| 15 | 20 | 960 |
| 20 | 4 | 960 |
| 40 | 2 | 640 |

*HA/1.0 ml.

To infected egg allantoic fluid was added the appropriate amounts of iron oxide. The mixtures were then shaken for 30 minutes at room temperature after which the iron oxide-virus complexes were removed with a magnet and the supernatants discarded. The sediment was then eluted with 10 percent $Na_2HPO_7 \cdot 7H_2O$ by shaking for 10 minutes, the iron oxide again removed, and the supernatant fluid titrated for its remaining virus content.

It is thus clearly shown that adsorption rises rapidly to a maximum efficiency of about 10 mg./ml. and all of the original activity is regained in the eluate from the phosphate treated $Fe_2O_3$-virus complex.

EXAMPLE IV

The table below demonstrates the effective dissociation of an influenza PR-8 virus from the corresponding iron oxide complex:

Elution with 10% $Na_2HPO_4 \cdot 7H_2O$: Virus concentration
Original _____ [1] 960

Adsorption supernate _____ 30
Physiological saline wash of $Fe_2O_3$+virus _____ 40
5X conc. extracts in $Na_2HPO$ _____ 3840

Elution with 9% $NaHCO_3$ (saturated):
Original _____ 960
Adsorption supernate _____ 30
Physiological saline wash of $Fe_2O_3$+virus _____ 40
5X conc. extract in $NaHCO_3$ _____ 5180

[1] HA/1.0 ml.

The influenza PR-8 strain is adsorbed from egg allantoic fluid with 20 mg./ml. $Fe_2O_3$ by shaking at room temperature for 20 minutes. The iron oxide-virus complex is then removed with a magnet and the supernatant fluids titrated and then discarded. The sediment is resuspended in a physiological sodium chloride solution to wash and then magnetically recovered and the wash fluids discarded. The sediment of iron oxide plus adsorbed virus is then resuspended in ⅕ original fluid volume of the above indicated sodium salt to dissocate the virus and subsequently titrated for its virus hemagglutinin content.

EXAMPLE V

The table below summarizes the antibody responses in guinea pigs which are vaccinated wtih a single dose of a 5-strain polyvalent inactivated influenza vaccine wherein the components were concentrated by adsorption onto iron oxide and then eluted in a concentrate, as in Example IV.

CONCENTRATION OF FIVE INFLUENZA ANTIGENS ON FERRIC OXIDE AND ANTIBODY RESPONSE IN VACCINATED GUINEA PIGS

I. Virus Titers During Vaccine Processing

| Material | Virus Strain | | | | |
|---|---|---|---|---|---|
| | AA | PR-8 | Jap 170 | B-Md. | B/Le |
| Egg Harvest fluid | [1] 640 | 2,560 | 160 | 80 | 320 |
| Monovalent vaccine (orig.) | 640 | 2,560 | 160 | 80 | 320 |
| Supernate from $Fe_2O_3$ adsorb | 128 | 128 | 4 | 4 | 64 |
| Supernate concentrated 10X | 5,120 | 32,000 | 640 | 640 | 2,560 |
| Actual concentration based on HA | 8X | 12.5X | 4X | 8X | 8X |

II. Vaccine Injected Intramuscularly, 0.5 ml.

| Material | AA | PR-8 | Jap 170 | B-Md. | B/Le |
|---|---|---|---|---|---|
| Original | [2] 128 | 512 | 32 | 16 | 64 |
| Supernate from $Fe_2O_3$ | 25 | 25 | 1 | 1 | 13 |
| 10X Concentrate | 1,024 | 6,400 | 128 | 128 | 512 |

III. Antibody Titers of Pooled Guinea Pig Sera 3 Wks. Post-Vaccination with 5 Vaccines Shown

| Material | AA | PR-8 | Jap 170 | B-Md. | B/Le |
|---|---|---|---|---|---|
| Original | [3] 10 | 40 | 320 | 10 | 10 |
| Polyvalent Conc. Supernate | 10 | 20 | 20 | 20 | 10 |
| Polyvalent Conc. 10X | 40 | 80 | 80 | 10 | 10 |
| Monovalent Conc. Supernate | 10 | 10 | 20 | 10 | 10 |
| Monovalent Conc. 10X | 80 | 80 | 80 | 20 | 20 |

IV. Geometric Means of Individual Serum Titers

| Material | AA | PR-8 | Jap 170 | B-Md. | B/Le |
|---|---|---|---|---|---|
| 15 animals—original | 3.2 | 8.2 | 5.0 | 2.5 | 1.8 |
| 15 animals—supernate | 2.1 | 3.9 | 1.8 | 3.1 | 1.4 |
| 11 animals—10X conc. of supernate | 26.3 | 42.6 | 15.2 | 13.7 | 6.7 |

V. Protein Concentration, μgm./ml.

| Material | AA | PR-8 | Jap 170 | B-Md. | B/Le |
|---|---|---|---|---|---|
| Original | 1,125 | 760 | 1,900 | 310 | 360 |
| Monovalent supernatant | 375 | 300 | 450 | 105 | 150 |
| 10X | 1,325 | 480 | 1,040 | 300 | 575 |

VI. Total Nitrogen Concentration, μgm./ml.

| Material | Virus Strain | | | | |
|---|---|---|---|---|---|
| | AA | PR-8 | Jap 170 | B-Md. | B/Lee |
| Original | 654.3 | 609 | 693 | 610 | 620 |
| Supernate | 551 | 622 | 594 | 620 | 575 |
| 10X | 109 | 58 | 81 | 24 | 44 |

VII. Iron Analysis—Residual in Vaccine, μgm/ml.

| Material | AA | PR-8 | Jap 170 | B-Md. | B/Lee |
|---|---|---|---|---|---|
| Original | <0.2 | <0.2 | <0.2 | <0 2 | <0.2 |
| 10X | <0.2 | 0.2 | <0.2 | 0.8 | 2.0 |

[1] HA Units/0.5 ml.
[2] HA Units/dose.
[3] HAI Titer—Reciprocal of Serum Dilution.

The results shown indicate that it is possible to concentrate and purify influenza virus antigen by this method and produce enhanced levels of antibody in a vaccinated host.

EXAMPLE VI

The biological vaccine prepared by the method described in Example IV above retains its antigenic stability for prolonged periods as shown in the following example.

RETENTION OF HA TITERS IN INFLUENZA VIRUSES 10X CONCENTRATED BY THE FERRIC OXIDE ADSORPTION PROCEDURE AND STORED AT 5° C. FOR 56 DAYS

| | AA | PR-8L | Jap 170 | B/Md. | B/Lee |
|---|---|---|---|---|---|
| Original | 5,120 | 32,000 | 640 | 640 | 2,650 |
| After Storage | 5,120 | 10,000 | 640 | 1,280 | 5,120 |

EXAMPLE VII

The procedure of Example I is repeated wherein the influenza strains shown are grown in the egg allantoic fluid simultaneously in the presence of the particulate iron oxide. Substantially the same results are obtained indicating no side effects resulted from the presence of iron oxide during the cultivation stage. Experimentally, a suspension of iron oxide is inoculated with the virus into the eggs. Controls are also prepared containing virus alone. The resulting eggs are incubated for 48 hours at 35° C., after which time the virus content of the allantoic fluid in the treated eggs and the control untreated eggs is determined. Comparatively, the yields from both are essentially equivalent.

EXAMPLE VIII

A glass column with an inner diameter of 1.6 cm. and 22 cm. in length is fitted at the lower end with a perforated rubber stopper. Directly above the stopper is placed a layer (about 1 cm.) of packed glass wool and on top of this is placed a 4 cm. column composed of a mixture of Celite No. 545 [1] (3 g.) and magnetic iron oxide (211 mg.). On top of the column is placed seas and (0.05 cm.).

A concentration of influenza virus, strain B/G1 (3200 HA/1.0 ml.) is introduced into the filter column in a 10 ml. volume. After the virus flowed through, it was periodically followed by 10 ml. of aliquots of physiological saline solution. Each of these sequential aliquots is separately collected as numbered effluent fractions and tested for their concentration of influenza antigen by means of a hemagglutination test. Results indicated virtually complete retention by the column.

EXAMPLE IX

The procedure of Exmaple VIII is repeated wherein sand is used in lieu of Celite with comparable results.

EXAMPLE X

The procedure of Example VIII is repeated wherein an equivalent concentration of poliomyelitis virus is used in lieu of influenza virus with comparable results.

EXAMPLE XI

The procedure of Example VIII is repeated wherein an equivalent concentration of infectious hepatitis virus is used in lieu of influenza virus with comparable results.

[1] Trademark of Johns-Manville Co., for diat

EXAMPLE XII

The procedure of Example VIII is repeated wherein an equivalent concentration of *E. coli* bacteria is used in place of influenza virus with comparable results.

EXAMPLE XIII

The procedure of Example VIII is repeated wherein an equivalent concentration of *Leptospira protozoan* is used in place of influenza virus with comparable results.

EXAMPLE XIV

The procedure of Example VIII is repeated and the influenza virus is removed from the column in the following manner: an aqueous solution (20% by wt.) of $MgSO_4$ (50 ml.) is added in 10 ml. portions in order to elute the entrapped antigen. Hemagglutination tests carried out on the eluates indicated virtually complete removal from the column.

EXAMPLE XV

The procedure of Example XIV is repeated wherein equivalent amounts of the following 20% by weight aqueous solutions are used in lieu of $MgSO_4$:

$MgCO_3$ $Mg_3(PO_4)_2$ $Na_2CO_3$ $Na_3PO_4$ $Na_2SO_4$

Equivalent results are obtained.

EXAMPLE XVI

The procedure of Example VIII is repeated wherein two copper electrodes are placed in contact with the top and bottom of the Celite-iron oxide mixture and held in place by sand. In order to remove the virus from the column, 2 milliamperes is applied (40 v., D.C.) to the column which is then eluted with physiological saline. Virtually all of the pathogen is removed.

What is claimed is:

1. A process for the concentration and purification of viruses which comprises contacting a virus-infected aqueous cell, tissue or nutrient broth virus culture system with particulate magnetic iron oxide until the virus adsorbs on or complexes with the said iron oxide; magnetically removing the resulting iron oxide-virus complex; eluting the said complex to dissociate it by treatment with a saturated aqueous solution of a sodium or magnesium salt of phosphoric, sulfuric or carbonic acid; and magnetically removing the dissociated iron oxide.

2. A process as in claim 1 wherein said virus is an influenza virus.

3. A process as in claim 1 wherein said virus is a poliomyelitis virus.

4. A process as in claim 1 wherein said virus is cultivated in an aqueous medium in the presence of said particulate iron oxide.

References Cited

UNITED STATES PATENTS

| | | | |
|---|---|---|---|
| 2,125,846 | 8/1938 | Laughlin | 210—42 |
| 2,351,160 | 6/1944 | Stone et al. | 210—30 XR |
| 2,461,505 | 2/1949 | Daniel | 167—78 |
| 2,642,514 | 6/1953 | Herkenhoff | 210—24 |
| 2,749,306 | 6/1956 | Coleman | 210—24 |
| 2,999,792 | 9/1961 | Segre | 167—84.5 |
| 3,078,224 | 2/1963 | Schulze et al. | 210—30 |
| 3,139,401 | 6/1964 | Hach | 210—30 |
| 3,197,374 | 7/1965 | Hennessen et al. | 167—78 |
| 3,256,152 | 6/1966 | Lampson | 167—78 |
| 3,351,203 | 11/1967 | Robb | 210—222 XR |

FOREIGN PATENTS

| | | |
|---|---|---|
| 887,339 | 1/1962 | Great Britain. |
| 876,027 | 8/1961 | Great Britain. |

S. K. ROSE, Primary Examiner

U.S. Cl. X.R.

195—1.1; 209—8, 215; 210—222; 424—89